United States Patent
Bennett et al.

(10) Patent No.: US 11,160,281 B2
(45) Date of Patent: Nov. 2, 2021

(54) SAFENER CONTAINING HERBICIDAL OIL DISPERSION

(71) Applicant: ARYSTA LIFESCIENCE INC., Cary, NC (US)

(72) Inventors: Stephen Craig Bennett, Valdosta, GA (US); Bhupinder Baath, Davis, CA (US); Hong Zhang, Cary, NC (US); Carlton Stephen Seckinger, Valdosta, GA (US); Emma Louise Hawkins, Worcestershire (GB); Charlie James Flood, Worcestershire (GB)

(73) Assignee: ARYSTA LIFESCIENCE INC., Cary, NC (US)

(*) Notice: Subject to any disclaimer, the term of this patent is extended or adjusted under 35 U.S.C. 154(b) by 0 days.

(21) Appl. No.: 15/992,913

(22) Filed: May 30, 2018

(65) Prior Publication Data

US 2018/0343867 A1 Dec. 6, 2018

Related U.S. Application Data

(60) Provisional application No. 62/512,343, filed on May 30, 2017.

(51) Int. Cl.
| | | |
|---|---|---|
| *A01N 47/38* | (2006.01) |
| *A01N 25/32* | (2006.01) |
| *A01N 25/04* | (2006.01) |
| *A01N 47/36* | (2006.01) |
| *A01N 43/42* | (2006.01) |
| *A01N 25/30* | (2006.01) |

(52) U.S. Cl.
CPC .............. *A01N 47/38* (2013.01); *A01N 25/04* (2013.01); *A01N 25/32* (2013.01); *A01N 43/42* (2013.01); *A01N 47/36* (2013.01); *A01N 25/30* (2013.01); *A01N 2300/00* (2013.01)

(58) Field of Classification Search
CPC ........ A01N 47/38; A01N 25/04; A01N 25/32; A01N 2300/00; A01N 25/30; A01N 43/42; A01N 47/36
See application file for complete search history.

(56) References Cited

U.S. PATENT DOCUMENTS

| | | | |
|---|---|---|---|
| 2005/0042245 A1 | 2/2005 | Taranta et al. |
| 2008/0032891 A1 | 2/2008 | Gaytan et al. |
| 2009/0111693 A1* | 4/2009 | Ikeuchi ................. A01N 25/32 |
| | | | 504/110 |
| 2014/0128258 A1 | 5/2014 | Satchivi et al. |
| 2015/0289505 A1 | 10/2015 | Jin et al. |
| 2016/0021877 A1* | 1/2016 | Mertoglu ............. A01N 43/653 |
| | | | 514/383 |

FOREIGN PATENT DOCUMENTS

| | | | |
|---|---|---|---|
| CN | 106465717 A | 3/2017 |
| EP | 0024188 A1 | 2/1981 |
| EP | 2672826 B1 * | 5/2015 | ............. A01N 43/80 |

OTHER PUBLICATIONS

International Search Report for PCT/US2018/035149, dated Sep. 25, 2018.
International Search Report; International Application No. PCT/US2018/035149; International Filing Date May 30, 2018; dated Sep. 25, 2018; 4 pages.
IPRP for PCT/US2018/035149 dated Dec. 3, 2019.

* cited by examiner

*Primary Examiner* — John Pak
*Assistant Examiner* — Andriae M Holt
(74) *Attorney, Agent, or Firm* — Cantor Colburn LLP

(57) ABSTRACT

A safener containing herbicidal oil dispersion. An oil dispersion is described containing a base oil, an herbicide composition including a comprising flucarbazone sodium and/or fenoxaprop-p-ethyl, an herbicidal safener comprising cloquintocet-mexyl, and a carrier comprising an alkyl benzoate. The dispersion demonstrates enhanced dilution, and high and low temperature stability.

18 Claims, No Drawings

SAFENER CONTAINING HERBICIDAL OIL DISPERSION

CROSS_REFERENCE TO RELATED APPLICATION

This application is a non-provisional application claiming the benefit under 35 U.S.C. § 119(e) of U.S. Provisional Application No. 62/512,343 filed May 30, 2017, the disclosure of which is expressly incorporated by reference herein in its entirety.

TECHNICAL FIELD

The field of art to which this invention generally pertains is herbicidal compositions.

BACKGROUND

Safeners are compounds that are added to herbicidal formulations to eliminate or reduce phytotoxic effects of the herbicide to certain crops. These compounds are used to protect crops from injury by herbicides but typically do not prevent the herbicide from controlling undesired vegetation. Examples of herbicide safeners include, for example, benoxacor, cloquintocet, cumyluron, cyometrinil, cyprosulfamide, daimuron, dichlormid, dicyclonon, dimepiperate, fenchlorazole-ethyl, fenclorim, flurazole, fluxofenim, furilazole, isoxadifen-ethyl, mefenpyr-diethyl, mephenate, methoxyphenone, naphthalic anhydride, oxabetrinil, N-(aminocarbonyl)-2-methylbenzenesulfonamide and N-(aminocarbonyl)-2-fluorobenzenesulfonamide, 1-bromo-4-[(chloromethyl)sulfonyl]benzene, 2-(dichloromethyl)-2-methyl-1,3-dioxolane (MG 191), 4-(dichloroacetyl)-1-oxa-4-azospiro[4.5]decane (MON 4660).

Cloquintocet mexyl (CQM) is known to easily convert to its hydrate form upon contact with water. Cloquintocet mexyl hydrate can then proceed to precipitate as large needles that hinder such things as sprayability and subsequently its ability to function as an herbicide safener. Because of this undesirable hydrate formation, cloquintocet mexyl is typically formulated as an emulsifiable concentrate (EC) or oil dispersion (OD), where it is dissolved in an organic solvent and is thereby isolated from contact with water, or as dry formulations, including wettable powders (WP) and water dispersible granules (WG). Additives have also been included in these formulations to inhibit cloquintocet mexyl hydrate formation or crystal growth upon dilution of the concentrates or dispersing of the granules into water for spray application.

Because of the increasing concern over use of organic solvents in agricultural formulations due to their cost, flammability, adverse health effects and contribution to environmental pollution, aqueous formulations have seen increasing use. The oil-in-water emulsion (EW) is one of the most common aqueous formulations used for many agricultural products, where droplets of oil stabilized by surfactant emulsifiers as a discrete phase are uniformly dispersed in water as a continuous phase. However, many stability challenges exist with these formulations when the emulsion is physically unstable and phase separations occur or when oil soluble ingredients are incompatible with ingredients in the aqueous phase. Cloquintocet mexyl dissolved in the dispersed oil phase of an oil-in-water emulsion presents a particular challenge. Preventing contact of cloquintocet mexyl with water is necessary to prevent such things as cloquintocet mexyl hydrate formation, Ostwald ripening and formulation instability.

Accordingly, there is a constant search in this area for enhancing the stability of oil dispersion formulations containing cloquintocet mexyl.

BRIEF SUMMARY

An oil dispersion is described including an herbicide composition containing a sulfonyl-amino-carbonyl-triazolinone; an herbicidal safener containing cloquintocet; an alkyl benzoate having an alkyl containing up to 10 carbon atoms; and optionally a base oil, the dispersion demonstrating enhanced dilution, and high and low temperature stability.

Additional embodiments include: the oil dispersion described above additionally containing fenoxaprop; the oil dispersion described above where the carrier is present in the dispersion in an amount up to 80% percent by volume; the oil dispersion described above where the carrier is present in the dispersion in an amount from 10 to 80 percent by volume; the oil dispersion described above additionally containing a dispersant, said dispersant comprising an oil-soluble nonionic polymeric surfactant and an emulsifier system, the emulsifier system comprising one or more anionic surfactants and/or one or more non-ionic surfactants; the oil dispersion described above where the cloquintocet is provided as cloquintocet mexyl; the oil dispersion described above where the herbicide comprises flucarbazone and/or flucarbazone sodium and/or amicarbazone; the oil dispersion described above which additionally contains one or more of pyroxsulam, metsulfuron-M, cloqdinafop, pinoxaden, halauxifen-methyl, and/or florasulam; the oil dispersion described above where the herbicide comprises one or more of pyroxsulam, metsulfuron-M, cloqdinafop, pinoxaden, halauxifen-methyl, and/or florasulam; the oil dispersion described above where the herbicide is present in an amount in a range from about 2 to about 50 weight percent of the oil dispersion; the oil dispersion described above where cloquintocet mexyl is present in an amount in a range from about 2 to about 10 weight percent of the oil dispersion; the oil dispersion described above where the base oil is selected from the group consisting of soybean oil, rapeseed oil, olive oil, *castor* oil, sunflower seed oil, coconut oil, corn oil, cottonseed oil, linseed oil, palm oil, peanut oil, safflower oil, sesame oil, tung oil kapok oil, *papaya* oil, *camellia* oil, rice bran oil, esters of any of the foregoing, alkoxylated oils of any of the foregoing, methyl and ethyl esters of fatty acids, mineral oils, paraffinic and isoparaffinic oils, esters, aromatic solvents, and combinations of one or more of the foregoing; the oil dispersion described above where the base oil is selected from the group consisting of methylated rapeseed oil, ethoxylated soybean oil, methyl-5-(dimethylamino)-2-methyl-5-oxopentanoate, alkyl dimethylamide, 2-ethylhexyl lactate, methyl caprylate caproate, methyl stearate, *canola* oil, and combinations of one or more of the foregoing; the oil dispersion described above where the dispersant is present in a range of about 0.1 to about 20.0 percent by weight of the oil dispersion; the oil dispersion described above where dispersant is present in a range of about 0.5 to about 5.0 percent by weight of the oil dispersion; the oil dispersion described above where the nonionic surfactant of the emulsifier system comprises one or more nonionic surfactants selected from the group consisting of fatty alcohol ethoxylates, tristyrylphenol ethoxylates, alkylphenolethoxylates, *castor* oil ethoxylates, fatty acid ethoxylates, alkylpolyglucosides, sorbitan ethoxylates, and ethylene oxide-propylene oxide-ethylene oxide block copolymers; the oil dispersion described above where the anionic surfactant of the emulsifier system comprises one or more anionic surfactants selected from the group consisting of salts of dodecylbenzenesulfonate, sodium dioctylsulfosuccinate, salts of tristyrylphenol ethoxylate phosphates, salts of fatty acids, salts of alkyl sulfates, salts of alkylether sulfates, salts of alkylether phosphates, and sodium N-methyl-N-oleyltaurate; the oil dispersion described above where the emulsifier system is present in a range from about 5 to about 20 percent by weight of the oil dispersion; the oil dispersion described above where the emulsifier system is present in a range from about 10 to about 15 percent by weight of the oil dispersion; the oil dispersion described above where the ratio of anionic to non-ionic surfactant is in a range from about 0.1:10 to about 10:0.1; the oil dispersion described above where the ratio of anionic to non-ionic surfactant is in a range from about 1:5 to about 5:1; the oil dispersion described above where the ratio of anionic to non-ionic surfactant is in a range from about 1:3 to 3:1; the oil dispersion described above additionally containing a thickener; the oil dispersion described above where the thickener is a hydrophobic fumed silicas, bentonite, castor wax, magnesium stearate, or aluminum/magnesium hydroxide stearate, or a combinations thereof; the oil dispersion described above where the composition comprises about 0.10 to about 10 percent by weight of the thickener; the oil dispersion described above where the composition comprises about 0.25 to about 3.0 percent by weight of thickener; and the oil dispersion described above additionally containing one or more additives comprising an absorbent, an antifoaming agent, a stabilizer, an antifreeze agent, a base, an acid, and a buffer.

A method of preparing an herbicidal composition as oil dispersion is also described including mixing an herbicide comprising a sulfonyl-amino-carbonyl-triazolinone, an herbicidal safener comprising cloquintocet, optionally a base oil, a dispersant comprising an oil soluble nonionic polymeric surfactant, a carrier comprising an alkyl benzoate having an alkyl containing up to 10 carbon atoms, and an emulsifier system, the emulsifier system comprising one or more anionic surfactants and/or one or more non-ionic surfactants to provide an herbicidal mixture; and diluting the mixture with water.

Additional embodiments include: the method described above where the alkyl benzoate is a butyl benzoate; the method described above where the cloquintocet is provided as cloquintocet mexyl; the method described above where the herbicide comprises flucarbazone, flucarbazone sodium or amicarbazone; the method described above where the herbicide additionally contains fenoxoprop; the method described above where the herbicide is present in an amount in a range from about 2 to about 50 weight percent of the herbicidal mixture; the method described above where cloquintocet mexyl is present in an amount in a range from about 2 to about 10 weight percent of the herbicidal mixture; the method described above where the base oil is selected from the group consisting of soybean oil, rapeseed oil, olive oil, castor oil, sunflower seed oil, coconut oil, corn oil, cottonseed oil, linseed oil, palm oil, peanut oil, safflower oil, sesame oil, tung oil kapok oil, papaya oil, camellia oil, rice bran oil, esters of any of the foregoing, alkoxylated oils of any of the foregoing, methyl and ethyl esters of fatty acids, mineral oils, paraffinic and isoparaffinic oils, esters, aromatic solvents, and combinations of one or more of the foregoing; the method described above further comprising a thickener; the method described above where the thickener is selected from the group consisting of hydrophobic fumed silicas, bentonite, castor wax, magnesium stearate, aluminum/magnesium hydroxyl stearate, and combinations of one or more of the foregoing; the method described above further comprising adding one or more additives selected from the group consisting of an absorbent, an antifoaming agent, a stabilizer, an antifreeze agent, a base, an acid, and a buffer; the method described above where the diluted mixture comprises at least 50 percent by weight water; the method described above where the diluted mixture comprises between about 30 to about 95 percent by weight water; and the method described above where the diluted mixture comprises between about 40 to about 90 percent by weight water.

A method of controlling weeds is also described including providing an herbicidal mixture comprising an herbicide comprising a sulfonyl-amino-carbonyl-triazolinone, an herbicidal safener comprising cloquintocet, optionally a base oil, a carrier comprising an alkyl benzoate having an alkyl containing up to 10 carbon atoms, a dispersant comprising an oil soluble nonionic polymeric surfactant, and an emulsifier system, the emulsifier system comprising one or more anionic surfactants and/or one or more non-ionic surfactants; diluting the herbicidal mixture with water, where the herbicidal mixture is formulated as oil dispersion in water; and applying the diluted herbicidal mixture to a crop.

Additional embodiments include: the method described above where the alkyl benzoate is a butyl benzoate; the method described above where the cloquintocet is provided as cloquintocet mexyl; the method described above where the herbicide comprises flucarbazone, flucarbazone sodium or amicarbazone; the method described above where the applying step is performed post-emergently after the crop breaks ground; the method described above where the applying step is performed pre-emergently before the crop breaks ground; the method described above where the herbicide comprises flucarbazone sodium or amicarbazone; the method described above where the herbicide is present in an amount in a range from about 2 to about 50 weight percent of the herbicidal composition; the method described above where cloquintocet mexyl is present in an amount in a range from about 2 to about 10 weight percent of the herbicidal composition; the method described above where the base oil is selected from the group consisting of soybean oil, rapeseed oil, olive oil, castor oil, sunflower seed oil, coconut oil, corn oil, cottonseed oil, linseed oil, palm oil, peanut oil, safflower oil, sesame oil, tung oil kapok oil, papaya oil, camellia oil, rice bran oil, esters of any of the foregoing, alkoxylated oils of any of the foregoing, methyl and ethyl esters of fatty acids, mineral oils, paraffinic and isoparaffinic oils, esters, aromatic solvents, and combinations of one or more of the foregoing; the method described above where the herbicidal composition further comprises thickener; the method described above where the herbicidal composition further comprises one or more additives selected from the group consisting of an absorbent, an antifoaming agent, a stabilizer, an antifreeze agent, a base, an acid, and a buffer.

These, and additional embodiments, will be apparent from the following descriptions.

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Novel oil dispersions for herbicidal concentrate compositions containing a safener are described herein. Using butyl benzoate as a carrier in oil dispersions that include flucarbazone sodium stand-alone or flucarbazone sodium and fenoxaprop-p-ethyl, and cloquintocet mexyl as a safener results in high temperature stability, low temperature stability, and dilution stability. And while the description herein is in terms of butyl benzoate, other benzoates can be used as well, for example $C_1$, $C_2$, $C_3$, $C_5$, $C_6$, etc. as well as the $C_4$ (butyl) form.

The carrier also helps prevent cloquintocet crystallization at low temperatures and upon dilution in water. It should also be noted that while the butyl benzoate does solubilize the CQM, it does not act as a solvent for the flucarbazone (and related) materials, so will be referred to simply as a carrier. And while the butyl benzoate is described herein as a stand-alone carrier, it can be mixed with other compatible carriers (for example, rapeseed oil, and aromatic solvents including Aromatic 100, Aromatic 150 or Aromatic 200 (naphthalene containing solvents available from Exxon Mobile, for example, or their equivalent in a different brand name) as long as the added carrier does not adversely affect the chemical stability or the solubility or water miscibility of the CQM or dispersion or chemical stability or water miscibility of the flucarbazone compounds in the carrier. Typically the CQM is present in the carrier in an amount of about 4% by weight. At this concentration, up to about 60% by volume butyl benzoate is typically used, approximately two-thirds of which can be substituted with a compatible carrier which does not adversely affect the composition, as described above. And of course, with lower concentrations of the CQM present, these relative percentages could be adjusted accordingly.

It has been found that when cloquintocet-mexyl (CQM) is dispersed in oil phase it crystallizes in the concentrated oil dispersion at cold temperature storage, such as 0-5° C. The crystallization is reversible and the crystals disappeared when the samples are placed back in a room temperature condition. Furthermore, the suspended CQM also crystallized in water upon dilution forming cloquintocet hydrate. The degree and speed of crystallization depends on the temperature, use rate and hold duration of dilution. This is believed to be mainly caused by the CQM being partially dissolved in the original oil phase. It should also be noted that while the description herein centers around the use of CQM, cloquintocet acid or salt forms can be used in the composition in whole or in part as well as CQM to the extent they would be soluble in the butyl benzoate carrier.

The challenge is to identify a solvent that fully dissolves CQM at a desired loading (for example, up to 10% by weight) and while making sulfonyl-amino-carbonyl-triazolinone compounds such as flucarbazone and flucarbazone sodium (FCB) completely insoluble and having an acceptable toxicity profile. What has been discovered is using butyl benzoate as carrier results an agrichemical oil dispersion containing beneficial properties including the presence of both FCB and CQM. Such a delivery system successfully eliminates CQM crystallization issues either in concentrate or upon dilution. In addition, fenoxaprop-p-ethyl is difficult to mill as a suspension, therefore, uncovering a solvent that dissolves both fenoxaprop-p-ethyl and CQM while acting as a carrier for flucarbazone is unique. The delivery system also overcomes the challenges associated with the milling of fenoxaprop which is not normally available as a suspension (normally EC/EW).

Other benefits include: improved and higher solvency of cloquintocet mexyl; cloquintocet mexyl does not crystalize out at low temperature; cloquintocet hydrate does not form upon dilution due to the cloquintocet mexyl being completely solubilized and completely emulsified; improved bloom and spontaneity and dispersion in water; better low temperature product stability than current ODs; better product dilution properties than current ODs; elimination of product crystallization issues in dilution and removal of potential to clog screens.

With the use of butyl benzoate as the carrier, the cloquintocet mexyl is completely solubilized, the cloquintocet mexyl does not crystalize out at low temperatures, and the cloquintocet mexyl does not crystalize out upon dilution. Flucarbazone sodium and aryloxyphenoxy-propionate compounds such as fenoxaprop are also chemically stable in the butyl benzoate under either room temperature or accelerated temperature. The product also has extended shelf life, e.g., expected to be at least two years. The delivery system also has an acceptable toxicity profile according to current MSDS (Material Safety Data Sheets) data.

EXAMPLES

Exemplary formulations are demonstrated in Tables 1 and 2 below.

TABLE 1

|  | Example 1 | | | Example 2 | | | Example 3 | | |
|---|---|---|---|---|---|---|---|---|---|
|  | g/L (grams/liter) | % | nominal % | g/L | % | nominal % | g/L | % | nominal % |
| Butyl benzoate | 659.35 | 59.94 | 58.52 | 661 | 60.09 | 58.67 | 658.25 | 59.84 | 58.42 |
| Flucarbazone Sodium (94%) | 210 | 19.09 | 20.31 | 210 | 19.09 | 20.31 | 210 | 19.09 | 20.31 |
| Cloquintocet Mexyl (95%) | 42 | 3.82 | 4.02 | 42 | 3.82 | 4.02 | 42 | 3.82 | 4.02 |
| Calcium Alkylbenzene sulfonate | 77 | 7.00 | 7.00 | 77 | 7.00 | 7.00 | 77 | 7.00 | 7.00 |
| Fatty acid ethoxylate | 22 | 2 | 2 | 22 | 2 | 2 | 22 | 2 | 2 |
| Iso-tridecyl alcohol polyglycol ether | 66 | 6.00 | 6.00 | 66 | 6.00 | 6.00 | 66 | 6.00 | 6.00 |
| Organoclay | 12.65 | 1.15 | 1.15 | 11 | 1.00 | 1.00 | 13.75 | 1.25 | 1.25 |
| Polymer dispersant | 11 | 1.00 | 1.00 | 11 | 1.00 | 1.00 | 11 | 1.00 | 1.00 |
| Methyl esters fatty acids | X | X | X | X | X | X | X | X | X |
| Alcohol polyethoxylate | X | X | X | X | X | X | X | X | X |
| Sodium dioctyl sulposuccinate in hydrocarbons | X | X | X | X | X | X | X | X | X |
| Total | 1100 | 100 | 100 | 1100 | 100 | 100 | 1100 | 100 | 100 |

TABLE 2

|  | Example 4 | | | Example 5 | | |
|---|---|---|---|---|---|---|
|  | g/L | % | nominal % | g/L | % | nominal % |
| Butyl benzoate | 658.8 | 59.89 | 58.47 | 102 | 10.00 | 10.00 |
| Flucarbazone Sodium (94%) | 210 | 19.09 | 20.31 | 210 | 20.59 | 21.90 |
| Cloquintocet Mexyl (95%) | 42 | 3.82 | 4.02 | 42 | 4.12 | 4.33 |
| Calcium Alkylbenzene sulfonate | 77 | 7.00 | 7.00 | X | X | X |
| Fatty acid ethoxylate | 22 | 2 | 2 | X | X | X |
| Iso-tridecyl alcohol polyglycol ether | 66 | 6.00 | 6.00 | 61.2 | 6.00 | 6.00 |
| Organoclay | 13.2 | 1.20 | 1.20 | 10.2 | 1.00 | 1.00 |
| Polymer dispersant | 11 | 1.00 | 1.00 | 51 | 5.00 | 5.00 |
| Methyl esters fatty acids | X | X | X | 462.00 | 45.29 | 43.76 |
| Alcohol polyethoxylate | X | X | X | 40.80 | 4.00 | 4.00 |
| Sodium dioctyl sulposuccinate in hydrocarbons | X | X | X | 40.80 | 4.00 | 4.00 |
| Total | 1100 | 100 | 100 | 1020 | 100 | 100 |

The physical properties for Example 2 above were measured as demonstrated in Tables 3, 4, 5, 6, and 7 below.

TABLE 3

|  | | | Interval | | | |
|---|---|---|---|---|---|---|
|  | | | 2 weeks | | 1 month storage | |
| Temperature ° C. | Initial | F/T Sample | 54 | 0 | T/C | 40 |
| Flucarbazone Sodium Assay (% weight/weight) | 19.08 | 19.15<br>100.88 | 19.05<br>100.38 | 19.21<br>101.21 | 19.11<br>100.65 | 19.14<br>100.81 |
| Cloquintocet Assay (% weight/weight) | 3.82 | 4.05<br>104.94 | 3.95<br>102.21 | 3.91<br>101.33 | 3.91<br>101.40 | 3.87<br>100.28 |
| Initial Density grams/milliliter | 1.1100 | | | | | |
| Bleed (%) | | 0.0 | 17% | 19% | 19% | 40% |
| Sediment | | No | No | No | No | No |
| KF % Moisture (Karl Fischer) | 0.7234 | 0.7846 | 0.8534 | 1.001 | 0.9326 | 0.9541 |
| Wet Sieve | 0 | 0 | 0 | 0 | 0 | 0 |

TABLE 3-continued

| | | | Interval | | | |
|---|---|---|---|---|---|---|
| | | | 2 weeks | 1 month storage | | |
| Temperature ° C. | Initial | F/T Sample | 54 | 0 | T/C | 40 |
| pH 1% | 6.12 | 6.25 | 6.23 | 6.76 | 6.77 | 6.81 |
| Dispersion Stability-milliliters sediment | | | | | | |
| Room Temperature (RT) - 20 parts per million (ppm) (Bloom/Inv/1 hour (hr)/2 hr/24/crystals?) | G/2/0/0/—/no | G/3/0/0/0.01/no | G/3/0/0/<0.1/no | G/5/0/0/<0.1/no | G/5/0/0/<0.01/no | G/5/0/0/<0.01/no |
| RT - 342 ppm (Bloom/Inv/1 hr/2 hr/24/crystals?) | G/2/0/0/—/no | G/3/0/0/0.01/no | G/4/0/0/0/no | G/5/0/0/0.01/no | G/5/0/0/0.01/no | G/5/0/0/0.01/no |
| RT - 1000 ppm (Bloom/Inv/1 hr/2 hr/24/crystals?) | G/2/0/0/—/no | G/4/0/0/—/no | G/4/0/0/—/no | G/3/0/0/<0.1/no | G/3/0/0/<0.1/no | G/9/0/0/0/no |
| 2C - 20 ppm (Bloom/Inv/1 hr/2 hr/24/crystals?) | F/3/0/0/0.5/no | G/4/0/0/0.25/no | G/5/0/0/0.1/no | F/5/0/0/0.5/no | F/6/0/0/0.5/no | G/4/0/0/<0.1/no |
| 2C - 342 ppm (Bloom/Inv/1 hr/2 hr/24/crystals?) | F/3/0/0/0.1/no | G/5/0/0/<0.1/no | G/5/0/0/0.1/no | F/5/0/0/—/— | F/6/0/0/—/— | F/6/0/0/—/— |
| 2C - 1000 ppm (Bloom/Inv/1 hr/2 hr/24/crystals?) | F/3/0/0/0/no | G/6/0/0/<0.1/no | G/6/0/0/<0.1/no | F/7/0/0/—/— | F/7/0/0/—/— | F/7/0/0/—/— |
| Viscosity | 540 cP (centipoise) | 500 cP | 430 cP | NA | 475 cP | NA |
| Particle Size | | | | | | |
| d (0.5) μmeters(m) | 1.39 | 1.63 | 1.75 | 1.63 | 1.66 | 1.69 |
| d (0.9) μm | 4.42 | 4.74 | 5.63 | 5.08 | 5.48 | 5.63 |

TABLE 4

| | Interval 2 Month Storage | | | |
|---|---|---|---|---|
| Temperature ° C. | 0 | 25 | T/C | 40 |
| Flucarbazone Sodium Assay (% weight/weight) | 19.32 | 18.81 | | 19.42 |
| | 101.76 | 99.09 | | 102.32 |
| Cloquintocet Assay (% weight/weight) | 4.12 | 4.06 | | 4.07 |
| | 106.70 | 105.06 | | 105.44 |
| Initial Density grams/milliliter | | | | |
| Bleed (%) | 15% | 26% | | 60% |
| Sediment | N | T | | T |
| % Moisture (KF) | 6.42 | 6.28 | | 6.44 |
| Wet Sieve | 0 | 0.008 | | 0.004 |
| pH 1% | 6.42 | 6.28 | | 6.44 |
| Dispersion Stability - milliliters sediment | | | | |
| RT - 20 parts per million (ppm) (Bloom/Inv/1 hour (hr)/2 hr/24/crystals?) | G/4/0/0/trace/no | G/5/0/0/trace/no | | G/3/0/0/trace/no |
| RT - 342 ppm (Bloom/Inv/1 hr/2 hr/24/crystals?) | G/5/0/0/trace/no | G/6/0/0/trace/no | | G/6/0/0/trace/no |
| RT - 1000 ppm (Bloom/Inv/1 hr/2 hr/24/crystals?) | G/9/0/0/0/no | G/3/0/0/0/no | | G/5/0/0/0/no |
| 2C - 20 ppm (Bloom/Inv/1 hr/2 hr/24/crystals?) | G/4/0/0/<0.01/no | G/3/0/0/0.20/no | | G/6/0/0/0.01/no |
| 2C - 342 ppm (Bloom/Inv/1 hr/2 hr/24/crystals?) | G/4/0/0/<0.01/no | G/4/0/0/<0.01/no | | G/5/0/0/<0.01/no |
| 2C - 1000 ppm (Bloom/Inv/1 hr/2 hr/24/crystals?) | G/5/0/0/0/no | G/7/0/0/0/no | | G/4/0/0/0/no |
| Viscosity | NA | 480 cP | | NA |
| Particle Size | | | | |
| d (0.5) μmeters(m) | 1.55 | 1.65 | 1.63 | 1.68 |
| d (0.9) μm | 4.53 | 4.96 | 5.25 | 5.42 |

TABLE 5

| | Interval 3 Month Storage | | | |
|---|---|---|---|---|
| Temp (° C.) | −10 | 0 | 25 | 40 |
| Flucarbazone Sodium Assay (% w/w) | 19.16 | 19.07 | 19.13 | 19.08 |
| | 100.17 | 99.67 | 100.02 | 99.72 |
| Cloquintocet Assay (% w/w) | 3.93 | 3.92 | 3.93 | 3.84 |
| | 97.87 | 97.53 | 97.66 | 95.49 |
| Initial Density g/mL | | | | |
| Bleed (%) | T | 27.7 | 28.9 | 44.4 |
| Sediment | N | N | T in corners of jar | N |

TABLE 5-continued

| | Interval 3 Month Storage | | | |
|---|---|---|---|---|
| Temp (° C.) | −10 | 0 | 25 | 40 |
| % Moisture (KF) | 0.754 | 0.73 | 0.779 | 0.784 |
| Wet Sieve | 0 | 0 | 0 | 0 |
| pH 1% | 6.35 | 6.29 | 6.2 | 6.2 |
| Dispersion Stability - mL sediment | | | | |
| RT - 20 ppm (Bloom/Inv/1 hr/2 hr/24/crystals?) | G/4/0/ 0/0/<.05/N | G/4/0/ 0/.05/N | G/3/0/ 0/0/.10/N | G/3/0/ 0/0/.05/N |
| RT - 342 ppm (Bloom/Inv/1 hr/2 hr/24/crystals?) | G/4/0/ 0/0/T/N | G/5/0/ 0/0/T/N | G/3/0/ 0/0/T/N | G/2/0/ 0/0/T/N |
| RT - 1000 ppm (Bloom/Inv/1 hr/2 hr/24/crystals?) | G/2/0/ 0/0/0/N | G/2/0/ 0/0/0/N | G/3/0/ 0/0/T/N | G/3/0/ 0/0/T/N |
| 2C - 20 ppm (Bloom/Inv/1 hr/2 hr/24/crystals?) | P/3/0/ 0/T/.05/N | P/7/0/ 0/T/.05/N | P/5/0/ 0/T/.05/N | P/6/0/ 0/T/.10/N |
| 2C - 342 ppm (Bloom/Inv/1 hr/2 hr/24/crystals?) | P/4/0/ 0/0/.05/N | P/3/0/ 0/0/<.05/N | P/5/0/ 0/0/T/N | P/6/0/ 0/0/T/N |
| 2C - 1000 ppm (Bloom/Inv/1 hr/2 hr/24/crystals?) | P/5/0/ 0/T/T/N | P/8/0/ 0/T/T/N | P/6/0/ 0/T/T/N | P/10/ 0/0/0/0/N |
| Viscosity | | | | |
| Particle Size | | | | |
| d(0.5) μm | 1.61 | 1.68 | 1.72 | 1.81 |
| d(0.9) μm | 4.94 | 4.98 | 5.35 | 5.97 |

TABLE 6

| | Interval 6 Month Storage | | |
|---|---|---|---|
| Temp (° C.) | 0 | 25 | 40 |
| Flucarbazone Sodium Assay (% w/w) | 19.09 99.78 | 19.12 99.95 | 15.14 79.12 |
| Cloquintocet Assay (% w/w) | 3.88 96.46 | 3.88 96.57 | 3.55 88.43 |
| Initial Density g/mL | | | |
| Bleed (%) | 34.0 | 40.0 | 43.3 |
| Sediment | T in corners of jar | T in corners of jar | S in corners of jar |
| % Moisture (KF) | 0.742 | 0.725 | 0.679 |
| Wet Sieve | 0 | 0 | 1.469 |
| pH 1% | 5.99 | 6.19 | 6.44 |
| Dispersion Stability - mL sediment | | | |
| RT - 20 ppm (Bloom/Inv/1 hr/2 hr/24/crystals?) | G/3/0/ 0/.10/N | G/4/0/ 0/.05/N | P/4/0/ .15/.15/Y |
| RT - 342 ppm (Bloom/Inv/1 hr/2 hr/24/crystals?) | G/8/0/ 0/T/N | G/7/0/ 0/T/N | P/6/0/ .15//.15/Y |
| RT - 1000 ppm (Bloom/Inv/1 hr/2 hr/24/crystals?) | G/8/0/ 0/0/N | G/7/0/ 0/0/N | P/8/0/ .10/.10/Y |
| 2C - 20 ppm (Bloom/Inv/1 hr/2 hr/24/crystals?) | P/8/0/ 0/.10/N | P/6/0/ 0/.05/N | P/13/0/ .15/.20/Y |
| 2C - 342 ppm (Bloom/Inv/1 hr/2 hr/24/crystals?) | P/5/0/ 0/.05/N | P/9/0/ 0/.05/N | P/12/0/ .10/.10/Y |
| 2C - 1000 ppm (Bloom/Inv/1 hr/2 hr/24/crystals?) | P/9/0/ 0/0/N | P/9/0/ 0/0/N | P/12/0/ .20/.20/Y |
| Viscosity | | 580.0 | 570.0 |

TABLE 6-continued

| | Interval 6 Month Storage | | |
|---|---|---|---|
| Temp (° C.) | 0 | 25 | 40 |
| Particle Size | | | |
| d(0.5) μm | 4.24/4.27 | 5.05/5.05 | 6.75/6.23 |
| d(0.9) μm | 9.44/9.49 | 9.82/10.2 | 17.6/13.3 |

TABLE 7

| | Interval 9 Month Storage |
|---|---|
| Temp (° C.) | 25 |
| Flucarbazone Sodium Assay (% w/w) | 19.14 100.04 |
| Cloquintocet Assay (% w/w) | 4.05 100.70 |
| Initial Density g/mL | |
| Bleed (%) | 44.4 |
| Sediment | T in corners of jar |
| % Moisture (KF) | 1.122 |
| Wet Sieve | 0 |
| pH 1% | 6.93 |
| Dispersion Stability - mL sediment | |
| RT - 20 ppm (Bloom/Inv/1 hr/2 hr/24/crystals?) | G/9/0/0/0/no |
| RT - 342 ppm (Bloom/Inv/1 hr/2 hr/24/crystals?) | G/4/0/0/0/no |
| RT - 1000 ppm (Bloom/Inv/1 hr/2 hr/24/crystals?) | G/7/0/0/0/no |
| 2C - 20 ppm (Bloom/Inv/1 hr/2 hr/24/crystals?) | P/6/0/0/0/no |
| 2C - 342 ppm (Bloom/Inv/1 hr/2 hr/24/crystals?) | P/5/0/0/0/no |
| 2C - 1000 ppm (Bloom/Inv/1 hr/2 hr/24/crystals?) | P/8/0/0/0/no |
| Viscosity | |
| Particle Size | |
| d(0.5) μm | 1.91 |
| d(0.9) μm | 5.72 |

See also Table 8 for a more detailed description of some the materials appearing in the above tables and their functions.

TABLE 8

| DESCRIPTION | FUNCTION |
|---|---|
| Butyl benzoate | Carrier/solvent |
| Calcium Alkylbenzene sulfonate | Anionic Surfactant/Emulsifier |
| Fatty acid ethoxylate | Nonionic surfactant/emulsifier |
| Iso-tridecyl alcohol polyglycol ether | Nonionic surfactant/emulsifier |
| Organoclay | Rheology aid |
| Polymer | Dispersant |
| Methyl esters fatty acids | Carrier |
| Alcohol polyethoxylate | Nonionic surfactant/emulsifier |
| Sodium dioctyl sulphosuccinate in hydrocarbons | Anionic surfactant/emulsifier |

As described above, some of the benefits of the oil dispersions described herein include dilution compatibility (no crystallization), at room temperature or even colder temperatures, dissolution in the carrier including water, improved mixing compatibility with other solvents and carriers, and improved plant uptake.

As described herein, these problems and others in this area are addressed by the invention described herein. Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An oil dispersion comprising
   a. a suspended-herbicide comprising flucarbazone;
   b. a solubilized-safener comprising cloquintocet;
   c. a butyl benzoate carrier present in the dispersion in an amount from 10 to 80 percent by volume; and
   d. optionally, a base oil;
   wherein the dispersion demonstrates no crystallization of cloquintocet when stored at −10° C., 0° C., 25° C. and 40° C. for 3 months.

2. The oil dispersion of claim 1, which additionally contains fenoxaprop.

3. The oil dispersion of claim 1, additionally containing a dispersant, said dispersant comprising an oil-soluble nonionic polymeric surfactant and an emulsifier system, the emulsifier system comprising one or more anionic surfactants and/or one or more non-ionic surfactants.

4. The oil dispersion of claim 2 wherein said fenoxaprop is provided as fenoxaprop-p-ethyl.

5. The oil dispersion of claim 1, wherein the cloquintocet is provided as cloquintocet mexyl.

6. The oil dispersion of claim 1, wherein the base oil is selected from the group consisting of soybean oil, rapeseed oil, olive oil, Castor oil, sunflower seed oil, coconut oil, corn oil, cottonseed oil, linseed oil, palm oil, peanut oil, safflower oil, sesame oil, tung oil kapok oil, papaya oil, camellia oil, rice bran oil, esters of any of the foregoing, alkoxylated oils of any of the foregoing, methyl and ethyl esters of fatty acids, mineral oils, paraffinic and isoparaffinic oils, esters, aromatic solvents, and combinations of one or more of the foregoing.

7. The oil dispersion of claim 1, wherein the base oil is selected from the group consisting of methylated rapeseed oil, ethoxylated soybean oil, methyl-5-(dimethylamino)-2-methyl-5-oxopentanoate, alkyl dimethylamide, 2-ethylhexyl lactate, methyl caprylate caproate, methyl stearate, canola oil, and combinations of one or more of the foregoing.

8. The oil dispersion of claim 3, wherein the nonionic surfactant of the emulsifier system comprises one or more nonionic surfactants selected from the group consisting of fatty alcohol ethoxylates, tristyrylphenol ethoxylates, alkylphenolethoxylates, Castor oil ethoxylates, fatty acid ethoxylates, alkylpolyglucosides, sorbitan ethoxylates, and ethylene oxide-propylene oxide-ethylene oxide block copolymers.

9. The oil dispersion of claim 3, wherein the anionic surfactant of the emulsifier system comprises one or more anionic surfactants selected from the group consisting of salts of dodecylbenzenesulfonate, sodium dioctylsulfosuccinate, salts of tristyrylphenol ethoxylate phosphates, salts of fatty acids, salts of alkyl sulfates, salts of alkylether sulfates, salts of alkylether phosphates, and sodium N-methyl-N-oleyltaurate.

10. The oil dispersion of claim 1, additionally containing a thickener.

11. The oil dispersion of claim 10, wherein the thickener is a hydrophobic fumed silica, bentonite, Castor wax, magnesium stearate, or aluminum/magnesium hydroxide stearate, or a combination thereof.

12. The oil dispersion of claim 1, additionally containing one or more additives selected from the group consisting of an absorbent, antifoaming agent, a stabilizer, antifreeze agent, a base, an acid, and a buffer.

13. A method of preparing an herbicidal composition comprising:
    mixing the oil dispersion of claim 1, a dispersant comprising an oil soluble nonionic polymeric surfactant, and an emulsifier system, the emulsifier system comprising one or more anionic surfactants and/or one or more non-ionic surfactants to provide an herbicidal mixture; and
    diluting the herbicidal mixture with water to provide the herbicidal composition.

14. A method of controlling weeds comprising:
    a) providing an herbicidal mixture comprising:
       i) the oil dispersion of claim 1
       ii) a dispersant comprising an oil soluble nonionic polymeric surfactant, and
       iii) an emulsifier system, the emulsifier system comprising one or more anionic surfactants and/or one or more non-ionic surfactants;
    b) diluting the herbicidal mixture with water, wherein the herbicidal mixture is formulated as oil dispersion in water; and
    c) applying the diluted herbicidal mixture to a crop.

15. The method of claim 14, wherein the cloquintocet is provided as cloquintocet mexyl.

16. The method of claim 14, wherein the applying step is performed pre-emergently before the crop breaks ground and/or post-emergently after the crop breaks ground.

17. An oil dispersion comprising
    a. a suspended herbicide comprising flucarbazone sodium;
    b. a dissolved herbicide comprising fenoxaprop-p-ethyl;
    c. a dissolved safener comprising cloquintocet mexyl;
    d. a butyl benzoate carrier present in the dispersion in an amount from 10 to 80 percent by volume; and
    e. optionally, a base oil;
    wherein the dispersion demonstrates no crystallization of cloquintocet when stored at −10° C., 0° C., 25° C. and 40° C. for 3 months.

18. A method of controlling weeds comprising applying the oil dispersion according to claim 17 to a crop.

* * * * *